United States Patent
Kawakami et al.

(10) Patent No.: US 10,720,636 B2
(45) Date of Patent: Jul. 21, 2020

(54) METHOD FOR PRODUCING SINTERED ELECTRODE

(71) Applicant: TOYOTA JIDOSHA KABUSHIKI KAISHA, Toyota-shi, Aichi-ken (JP)

(72) Inventors: Masatsugu Kawakami, Sunto-gun (JP); Shingo Ohta, Numazu (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/894,389

(22) Filed: Feb. 12, 2018

(65) Prior Publication Data

US 2018/0277827 A1    Sep. 27, 2018

(30) Foreign Application Priority Data

Mar. 21, 2017   (JP) ................. 2017-054833

(51) Int. Cl.
*C04B 35/48* (2006.01)
*C04B 35/622* (2006.01)
(Continued)

(52) U.S. Cl.
CPC ......... *H01M 4/0471* (2013.01); *H01M 4/043* (2013.01); *H01M 4/131* (2013.01); *H01M 4/1391* (2013.01); *H01M 4/366* (2013.01); *H01M 4/525* (2013.01); *H01M 10/052* (2013.01); *H01M 10/0562* (2013.01);
(Continued)

(58) Field of Classification Search
None
See application file for complete search history.

(56) References Cited

U.S. PATENT DOCUMENTS 9,362,546 B1 *    6/2016   Donnelly ................. C04B 35/00
2009/0202905 A1 * 8/2009   Morita .................... H01M 4/131
                                                    429/212

(Continued)

FOREIGN PATENT DOCUMENTS

JP   2010-140664 A   6/2010
WO   2011/086649 A1  7/2011

OTHER PUBLICATIONS

Adams, Stefan, et al. "Effect of Li+/H+ Exchange in Water Treated Ta-doped Li7La3Zr2O12." Solid State Ionic, vol. 292, Sep. 2016, pp. 122-129.*

(Continued)

*Primary Examiner* — Ula C Ruddock
*Assistant Examiner* — Amanda Rosenbaum
(74) *Attorney, Agent, or Firm* — Sughrue Mion, PLLC (57) ABSTRACT

A sintered electrode having a large cathode capacity is obtained. A method for producing a sintered electrode which uses a lithium containing composite oxide as a cathode active material, and lithium lanthanum zirconate as an oxide solid electrolyte comprises: mixing at least the lithium containing composite oxide and a hydroxide, to obtain a cathode mixture; mixing at least the lithium lanthanum zirconate and a lithium salt that has a melting point lower than the lithium lanthanum zirconate, to obtain a solid electrolyte mixture; laminating the cathode mixture and the solid electrolyte mixture, to obtain a laminate; and heating the laminate, to sinter at least the solid electrolyte mixture.

7 Claims, 9 Drawing Sheets

(51) Int. Cl.
*H01M 4/04* (2006.01)
*H01M 4/131* (2010.01)
*H01M 4/1391* (2010.01)
*H01M 4/36* (2006.01)
*H01M 4/525* (2010.01)
*H01M 10/052* (2010.01)
*H01M 10/0562* (2010.01)
*H01M 10/058* (2010.01)
*H01M 4/02* (2006.01)

(52) U.S. Cl.
CPC .. *H01M 2004/028* (2013.01); *H01M 2220/20* (2013.01); *H01M 2300/0071* (2013.01); *H01M 2300/0077* (2013.01)

(56) References Cited

U.S. PATENT DOCUMENTS

2012/0305391 A1 12/2012 Kim et al.
2015/0171428 A1* 6/2015 Fujiki ................ H01M 10/058
429/322
2016/0359192 A1* 12/2016 Homma ............ H01M 10/0525

OTHER PUBLICATIONS

Yow, Zhen Feng, et al. "Effect of Li /H Exchange in Water Treated Ta-Doped Li7La3Zr2O12." Solid State Ionics, vol. 292, Jun. 9, 2016, pp. 122-129., doi:10.1016/j.ssi.2016.05.016.*

* cited by examiner

METHOD FOR PRODUCING SINTERED ELECTRODE

FIELD

The present application discloses a method for producing a sintered electrode that includes a cathode and an oxide solid electrolyte layer.

BACKGROUND

It is believed that in an oxide solid-state battery, which uses a solid oxide as an electrolyte, joining the cathode, oxide solid electrolyte layer, and anode by sintering makes it possible to reduce the interface resistance between a cathode and an oxide solid electrolyte layer, the interface resistance between the oxide solid electrolyte layer and an anode, and so on. On the other hand, the interface resistance in a solid-state battery whose layers cannot be joined by sintering such as a sulfide solid-state battery using a sulfide solid electrolyte that is easy to suffer heat deterioration is reduced by pressurizing the battery using a restraining member to increase contact interfaces of battery material in the present circumstances. That is, an advantage of an oxide solid-state battery is that any member for restraining a cathode, oxide solid electrolyte layer, and anode is not necessary, and energy density of a battery as a whole can be easily increased, compared with other types of solid-state batteries.

It is important for producing an oxide solid-state battery to sinter layers. For example, a cathode of an oxide solid-state battery can be composed by sintering a lithium containing composite oxide as a cathode active material. In this point, Patent Literature 1 discloses a method of filling a powder of $LiCoO_2$ which is one of lithium containing composite oxides into a mold, reducing a pressure inside the mold, and applying pressure sintering to the $LiCoO_2$ powder at a temperature from 800° C. to 880° C.

CITATION LIST

Patent Literature

Patent Literature 1: WO2011/086649A1

SUMMARY

Technical Problem

The inventors of the present application attempted to apply the art of Patent Literature 1 to production of an oxide solid-state battery, to join a cathode active material to an oxide solid electrolyte, and make a sintered electrode. Specifically, they attempted to layer a lithium containing composite oxide as a cathode active material, and lithium lanthanum zirconate (hereinafter may be referred to as "LLZ") as an oxide solid electrolyte, and heat them while pressurizing them, to join them by sintering. Here, it is necessary for joining the lithium containing composite oxide to LLZ by sintering to heat them at high temperature as disclosed in, for example, Patent Literature 1. The inventors encountered a problem that when the lithium containing composite oxide and LLZ were heated at high temperature, they chemically reacted with each other, to form a high resistance layer over the interface before sintering was completed. That is, it was found that it is necessary for producing a sintered electrode to make sintering temperature as low as possible. Lowered sintering temperature is advantageous in view of energy efficiency as well.

The inventors found that sintering temperature of an oxide solid electrolyte layer can be lowered by using a mixture of LLZ and a lithium salt having a melting point lower than LLZ (solid electrolyte mixture). Based on this finding, the inventors laminated the solid electrolyte mixture and the cathode active material to make a laminate, and heated the laminate at a temperature equal to or higher than the melting point of the lithium salt, to sinter the solid electrolyte mixture and join the cathode active material to the solid electrolyte mixture, whereby a sintered electrode where a cathode and oxide solid electrolyte layer are joined was able to be produced. However, the inventors encountered a problem that the cathode capacity of a sintered electrode produced as described above was small, and charge and discharge capacities sufficient as a whole of a battery were not able to be obtained when an oxide solid-state battery was produced.

Solution to Problem

The inventors speculated on causes of the above problem as follows:

(1) when the solid electrolyte mixture including LLZ and the lithium salt was heated and sintered, LLZ and the lithium salt reacted with each other, to generate an acid; and (2) when the solid electrolyte mixture was sintered to be joined to the cathode active material, the generated acid and the cathode active material reacted with each other, to deteriorate the cathode active material, which made the cathode capacity small. As a result, the charge and discharge capacities of the battery were reduced.

The inventors predicted that the deterioration of the cathode active material was able to be suppressed by neutralizing the acid generated by the reaction of LLZ and the lithium salt with a hydroxide. On the basis of this prediction, the inventors produced a sintered electrode using a cathode mixture including the cathode active material and a hydroxide, and the solid electrolyte mixture described above, and produced an oxide solid-state battery using this sintered electrode. Then, the inventors found that the charge and discharge capacities of the battery were outstandingly increased compared to the case where a hydroxide was not included.

Based on the above findings, the present application discloses a method for producing a sintered electrode which uses a lithium containing composite oxide as a cathode active material, and lithium lanthanum zirconate as an oxide solid electrolyte, the method comprising: mixing at least the lithium containing composite oxide and a hydroxide, to obtain a cathode mixture; mixing at least the lithium lanthanum zirconate and a lithium salt that has a melting point lower than the lithium lanthanum zirconate, to obtain a solid electrolyte mixture; laminating the cathode mixture and the solid electrolyte mixture, to obtain a laminate; and heating the laminate, to sinter at least the solid electrolyte mixture, as one means for solving the above problem.

"Mixing at least the lithium containing composite oxide and a hydroxide, to obtain a cathode mixture" means that the cathode mixture may contain other materials in addition to the lithium containing composite oxide and the hydroxide as long as the above problem can be solved.

"Lithium containing composite oxide" is not specifically restricted as long as being a composite oxide that can be used as a cathode active material for an oxide solid-state battery.

"Hydroxide" is a compound having a hydroxide ion as an anion.

"Mixing at least the lithium lanthanum zirconate and a lithium salt that has a melting point lower than the lithium lanthanum zirconate, to obtain a solid electrolyte mixture" means that the solid electrolyte mixture may contain other materials in addition to LLZ and the lithium salt as long as the above problem can be solved.

"Lithium salt" may be any salt of a lithium ion and an anion as long as the melding point thereof is lower than LLZ.

"Laminating the cathode mixture and the solid electrolyte mixture, to obtain a laminate" means that the cathode mixture and the solid electrolyte mixture are layered, to be laminated to each other. Here, other materials may be laminated along with the cathode mixture and the solid electrolyte mixture, to form the laminate. That is, the sintered electrode produced by heating the laminate may not only consist of two layers of a cathode and an oxide solid electrolyte layer, but also include layers other than the cathode and the oxide solid electrolyte layer, for example, consist of three layers of the cathode, the oxide solid electrolyte layer, and an anode.

In the method for producing a sintered electrode of the present disclosure, the lithium containing composite oxide used as the cathode active material preferably has a layered rock-salt structure. "The lithium containing composite oxide . . . has a layered rock-salt structure" means a composite oxide of particles (powder) of a composite oxide that contains lithium as an element forming a layered rock-salt crystal structure. When these particles are subjected to X ray diffraction, the diffraction peaks corresponding to a layered rock-salt crystal structure are confirmed.

Preferably, the method for producing a sintered electrode of the present disclosure comprises: substituting hydrogen for at least some of lithium that constitutes lithium lanthanum zirconate; and mixing hydrogen-substituted lithium lanthanum zirconate and the lithium salt, to obtain the solid electrolyte mixture.

In the method for producing a sintered electrode of the present disclosure, preferably, the melting point of the lithium salt is lower than 600° C., and when at least the solid electrolyte mixture is sintered by heating the laminate, the laminate is heated at a temperature of no less than the melting point of the lithium salt, and lower than 600° C.

The present application discloses a method for producing an oxide solid-state battery, the method comprising: obtaining a sintered electrode by the method for producing a sintered electrode of the present disclosure; and providing an anode for the sintered electrode.

"Providing an anode for the sintered electrode" is a concept embodying not only providing the anode by depositing anode material on a surface of the sintered electrode (a surface of an oxide solid electrolyte layer 9 on the opposite side of a cathode 8), etc. after producing the sintered electrode, but also, when producing the sintered electrode, heating the laminate, to sinter at least the solid electrolyte mixture, and at the same time to join the anode material to the solid electrolyte mixture (progressing joining the cathode mixture to the solid electrolyte mixture, and joining the anode material to the solid electrolyte mixture at the same time, using heat treatment on the laminate).

Advantageous Effects of Invention

According to the method for producing a sintered electrode of the present disclosure, sintering temperature of an oxide solid electrolyte layer can be lowered by using a solid electrolyte mixture including LLZ and a predetermined lithium salt, and as a result, sintering temperature of the sintered electrode can be lowered. According to the method for producing a sintered electrode of the present disclosure, an acid generated by reaction of LLZ and the lithium salt can be neutralized with a hydroxide, reaction of the cathode active material and the acid can be suppressed, and deterioration of a cathode active material can be suppressed, by using a cathode mixture including the cathode active material and the hydroxide. Producing an oxide solid-state battery using the sintered electrode obtained as described above makes the battery have high charge and discharge capacities.

DETAILED DESCRIPTION OF EMBODIMENTS

1. Method for Producing Sintered Electrode

Figure 1:
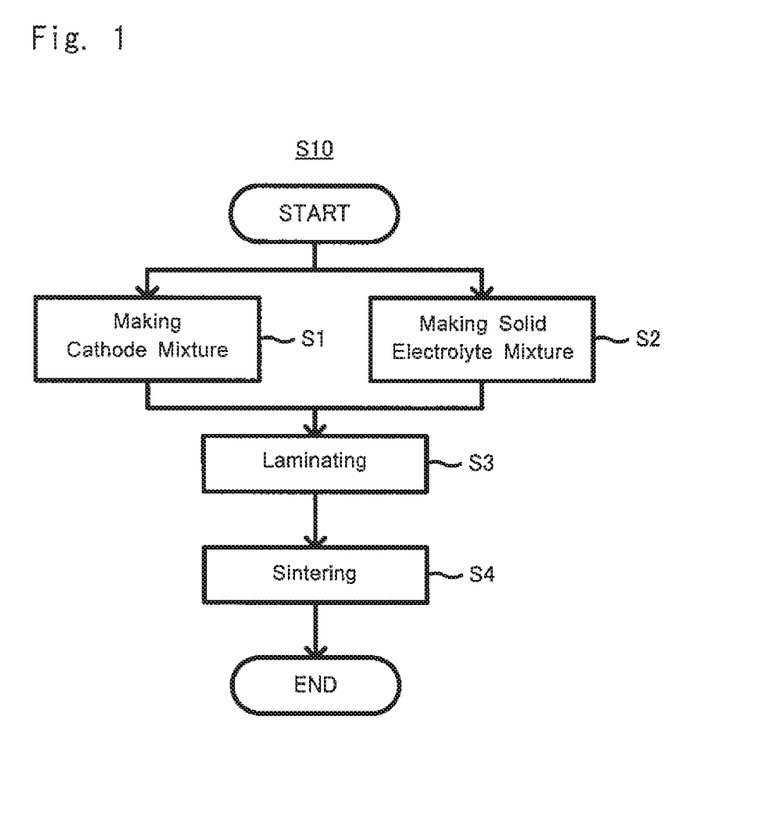
FIG. 1 is an explanatory view of a flow of a method for producing a sintered electrode S10.
Figure 2A:
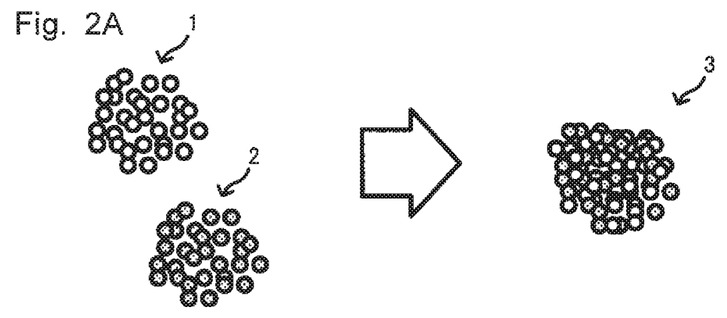
FIGS. 2A to 2D are explanatory views of the flow of the method for producing a sintered electrode S10.
Figure 2B:
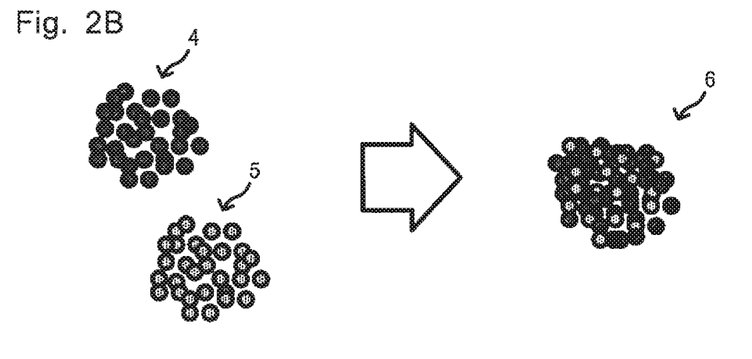
Figure 2C:
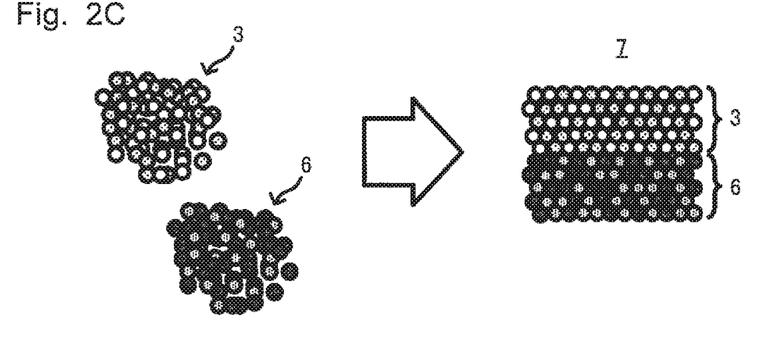
Figure 2D:
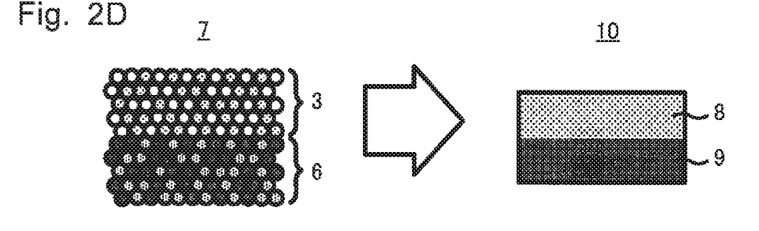

FIGS. 1 to 2D show the flow of a method for producing a sintered electrode S10. The producing method S10 is a method for producing a sintered electrode 10 which uses a lithium containing composite oxide 1 as a cathode active material, and lithium lanthanum zirconate 4 as an oxide solid electrolyte, the method comprising: a step S1 of mixing at least the lithium containing composite oxide 1 and a hydroxide 2, to obtain a cathode mixture 3; a step S2 of mixing at least the lithium lanthanum zirconate 4 and a lithium salt 5 that has a melting point lower than the lithium lanthanum zirconate 4, to obtain a solid electrolyte mixture 6; a step S3 of laminating the cathode mixture 3 and the solid electrolyte mixture 6, to obtain a laminate 7; and a step S4 of heating the laminate 7, to sinter at least the solid electrolyte mixture 6. The sintered electrode 10 is formed by joining at least a cathode 8 to an oxide solid electrolyte layer 9.

1.1. Step S1

As shown in FIG. 2A, in the step S1, at least the lithium containing composite oxide 1 and the hydroxide 2 are mixed, to obtain the cathode mixture 3.

1.1.1. Lithium Containing Composite Oxide 1

A lithium containing composite oxide 1 functions as a cathode active material of an oxide solid-state battery. Specific examples of such a composite oxide include composite oxides having layered rock-salt structures such as lithium cobaltate, lithium nickelate, and lithium nickel cobalt manganese oxide (layered rock-salt lithium oxide composed of manganese, cobalt, nickel, aluminum, etc.);

composite oxides having spinel structures such as lithium manganate; and composite oxides having olivine structures such as lithium iron phosphate. The above described problem of deterioration due to an acid may arise in every composite oxide described above. Specifically, this problem of deterioration due to an acid may remarkably arise in composite oxides having layered rock-salt structures. In view of this, a lithium containing composite oxide having a layered rock-salt structure is preferably used as the cathode active material. A lithium containing composite oxide having a layered rock-salt structure is preferably used as well in view of further improving battery performance.

The lithium containing composite oxide 1 may be acid-treated in advance. This acid treatment is not restricted as long as properties of a surface of the composite oxide 1 are changed by an acid. For example, the composite oxide 1 can be acid-treated by touching the composite oxide 1 to liquid that contains hydrogen ions. An acid used for acid treatment is not restricted as long as having hydrogen ions. The acid may be an inorganic acid such as hydrochloric acid, nitric acid, and sulfuric acid, and may be an organic acid such as acetic acid, formic acid, and oxalic acid. Temperature at which the composite oxide 1 is touched to the acid in acid treatment is not specifically restricted, but for example, may be an ambient temperature. Time for touching the composite oxide 1 to the acid is not specifically restricted as well. Any length of time may be taken therefor as long as the composite oxide 1 can keep its solid shape such as a particulate shape) after acid-treated. According to a finding of the inventors of the present application, even if the composite oxide 1 is acid-treated at an ambient temperature, a crystal structure of the lithium containing composite oxide is kept.

A shape of the lithium containing composite oxide 1 is not specifically restricted, but is specifically preferably a particulate shape. In this case, the particle size of the composite oxide 1 is not restricted, but is usually 0.1 μm to 0.1 mm although depending on the shape of the cathode in the sintered electrode.

1.1.2. Hydroxide 2

The hydroxide 2 is a compound having a hydroxide ion as an anion. Using such a compound can solve the above problem because all of such compounds can cause a neutralization reaction with an acid. In view of surely neutralizing an acid, and further improving battery performance, the hydroxide 2 is preferably an alkali metal hydroxide, and more preferably lithium hydroxide.

A shape of the hydroxide 2 is not specifically restricted, but is specifically preferably a particulate shape. In this case, the particle size of the hydroxide 2 is not restricted, but is usually 0.1 μm to 0.1 mm although depending on the shape of the cathode in the sintered electrode.

1.1.3. Other Materials

In the step S1, the cathode mixture 3 may contain other materials in addition to the composite oxide 1 and the hydroxide 2 as long as the above problem can be solved. For example, in view of lowering the sintering temperature of the cathode mixture 3, the lithium salt 5 described later is preferably mixed along with the composite oxide 1 and the hydroxide 2, to obtain the cathode mixture 3 in the step 1. When the cathode mixture 3 contains the lithium salt 5, a lithium salt same as, or different from the lithium salt 5 contained in the solid electrolyte mixture 6 may be contained.

It is believed that acid-treating the composite oxide 1 in advance before the step S1 leads to increased diffusibility of lithium over the surface of the composite oxide 1. That is, it is believed that using the acid-treated composite oxide 1 and the lithium salt 5 together makes lithium efficiently diffuse from the lithium salt 5 over the surface of the composite oxide 1, to promote sintering in the step S4 described later. Thus, the sintering temperature further lowers.

The cathode mixture 3 may contain a conductive material. Examples of the conductive material include carbon material and metallic material. It is believed that the conductive material makes it possible to improve electronic conductivity of the cathode. It is noted that the cathode obtained by the producing method S10 has relatively high density, and thus has high electronic conductivity without including the conductive material. That is, according to the producing method S10, the proportion of the cathode active material (lithium containing composite oxide) in the cathode can be relatively high, and the cathode capacity can be increased.

Further, the cathode mixture 3 may contain the solid electrolyte mixture described later. It is believed that whereby, the cathode 8 and the oxide solid electrolyte layer 9 can be more firmly joined. Also, effect of lowering the sintering temperature of the cathode mixture 3 as describe above is brought about because the solid electrolyte mixture 6 contains the lithium salt 5.

1.1.4. Mixing Ratio

In the step S1 the mixing ratio of the lithium containing composite oxide 1 and the hydroxide 2 is not limited. In view of surely neutralizing the generated acid, the amount of the hydroxide 2 is preferably as large as possible. In contrast, in view of securing high lithium ion conductivity and electronic conductivity, the amount of the lithium containing composite oxide 1 is preferably as large as possible. The mixing ratio of the lithium containing composite oxide 1 and the hydroxide 2 may be determined according to the properties of the cathode to be aimed. For example, when the amount of the composite oxide 1 is 100 parts by mass, the hydroxide 2 may be 1 part by mass to 100 parts by mass.

In the step S1, when the cathode mixture 3 contains the lithium salt 5, the mixing ratio thereof is not limited. In view of lowering the sintering temperature, the amount of the lithium salt 5 is preferably as large as possible. In contrast, in view of securing high lithium ion conductivity and electronic conductivity, the amount of the lithium containing composite oxide 1 is preferably as large as possible. The mixing ratio of the composite oxide 1 and the lithium salt 5 may be determined according to the properties of the cathode to be aimed. For example, when the amount of the composite oxide 1 is 100 parts by mass, the lithium salt 5 may be 1 part by mass to 100 parts by mass.

1.1.5. Mixing Method

In the step S1, mixing of the lithium containing composite oxide 1, the hydroxide 2, and other optional materials may be either dry mixing of solids with each other, or wet mixing using a solvent or the like. In view of more even arrangement of the hydroxide 2 around the composite oxide 1, wet mixing using a solvent or the like is preferable. In contrast, in view of simplification of the step without solvent treatment, dry mixing of solids with each other is preferable.

1.2. Step S2

As shown in FIG. 2B, in the step S2, at least the lithium lanthanum zirconate 4 and the lithium salt 5 that has a melting point lower than the lithium lanthanum zirconate 4 are mixed, to obtain the solid electrolyte mixture 6.

1.2.1. Lithium Lanthanum Zirconate 4

The lithium lanthanum zirconate (LLZ) 4 functions as an oxide solid electrolyte of an oxide solid-state battery. The LLZ 4 preferably has a garnet structure because lithium ion conductivity is further improved. The shape of the LIZ 4 is not specifically restricted, but is preferably a particulate shape. The particle size of the LLZ 4 in this case is not specifically limited, but usually 0.1 µm to 0.1 mm.

Hydrogen (H+) is preferably substituted for at least some of lithium (Li+) of the LLZ 4. That is, the producing method S10 preferably comprises a step S2a of substituting hydrogen for at least some of lithium that constitutes the LLZ 4; and a step S2b of mixing the hydrogen-substituted LLZ 4 and the lithium salt 5, to obtain the solid electrolyte mixture 6. A method for substituting hydrogen for some of lithium of the LLZ 4 is not specifically restricted. Hydrogen may be substituted for lithium by touching the LLZ 4 to liquid containing hydrogen ions, etc. Solutions of the above described various acids and, in addition, water may be used as liquid containing hydrogen ions. Specifically, hydrogen is preferably substituted for some of lithium of the LLZ 4 by touching the LLZ 4 to pure water. It is believed that hydrogen substitution leads to increased diffusibility of lithium over a surface of the LLZ 4. That is, it is believed that using the hydrogen-substituted LLZ 4 and the lithium salt 5 together makes lithium efficiently diffuse from the lithium salt 5 over the surface of the LIZ 4 in the step S4 described later. Thus, the sintering temperature further lowers.

1.2.2. Lithium Salt 5

The lithium salt 5 may be any salt of a lithium ion and an anion as long as the melting point thereof is lower than the LLZ 4. It is believed that a salt of a lithium ion and an anion reacts with the LLZ 4 and decomposes itself at a temperature equal to or higher than the melting point thereof, to generate an acid. This does not depend on an anion. It is believed that every lithium salt can generate an acid in the same way. That is, an anion in the lithium salt 5 is not specifically restricted.

The melting point of the lithium salt 5 is preferably as low as possible because the sintering temperature of the solid electrolyte mixture 6 can be further lowered. The melting point of the lithium salt 5 is preferably less than 600° C., and more preferably no more than 400° C.

Specific examples of the lithium salt 5 include lithium nitrate, lithium formate, lithium acetate, lithium chloride, and lithium sulfate. At least one is preferably selected from the above. Among them, at least one selected from lithium nitrate, lithium formate, and lithium acetate is preferable, and lithium nitrate is especially preferable because of advantage in view of the melting point, and no appearance of a different phase in the reaction with LLZ.

At least two lithium salts are mixed, to lower the melting point of the lithium salt 5. For example, the melting point of a mixture of lithium formate and lithium acetate is lower than that of lithium formate only or that of lithium acetate only. Thus, the lithium salt 5 is preferably a mixture of at least two lithium salts in view of further lowering the sintering temperature of the solid electrolyte mixture 6. In this case, the mixing ratio of different lithium salts in the mixture is not restricted. The lower the mixing ratio makes the melting point, the better. For example, when a mixture of lithium formate and lithium acetate is used as the lithium salt, it is preferable that the molar ratio of the lithium formate to lithium acetate (lithium formate/lithium acetate) in the mixture be ⅓ to 3. In this case, the melting point of the lithium salt lowers to, for example, no more than 250° C.

1.2.3. Other Materials

In the step S2, the solid electrolyte mixture 6 may contain other materials in addition to the LLZ 4 and the lithium salt 5 as long as the above problem can be solved. For example, a solid electrolyte other than the LLZ 4 can be used together in addition to the LLZ 4 in the solid electrolyte mixture 6. For example, a perovskite type oxide such as lithium lanthanum titanate, a NASICON type oxide such as $Li_{1+y}Al_yTi_{2-y}(PO_4)_3$ ($0 \leq y \leq 1$), etc. can be used together. It is noted that in view of improving lithium ion conductivity, a solid electrolyte in the solid electrolyte mixture 6 is preferably the LLZ 4 only.

1.2.4. Mixing Ratio

In the step S2, the mixing ratio of the LLZ 4 and the lithium salt 5 is not limited. In view of lowering the sintering temperature, the amount of the lithium salt 5 is preferably as large as possible. In contrast, in view of securing high lithium ion conductivity, the amount of the LLZ 4 is preferably as large as possible. The mixing ratio of the LLZ 4 and the lithium salt 5 may be determined according to the properties of the oxide solid electrolyte layer to be aimed. For example, when the amount of the LLZ 4 is 100 parts by mass, the lithium salt 5 may be 1 part by mass to 100 parts by mass.

1.2.5. Mixing Method

In the step S2, mixing of the LLZ 4 and the lithium salt 5 may be either dry mixing of solids with each other, or wet mixing using a solvent or the like. In view of more even arrangement of the lithium salt 5 around the LLZ 4, and lowering the sintering temperature of the solid electrolyte mixture 6 more, wet mixing using a solvent or the like is preferable. For example, the lithium salt 5 is dissolved in water, to make an aqueous solution, the LLZ 4 is immersed in the aqueous solution d then moisture is evaporated by heating, thereby the solid electrolyte mixture 6 composed of the LLZ 4, and the lithium salt 5 arranged around the LLZ 4 is obtained. On the other hand, in view of simplification of the step without solvent treatment, dry mixing of solids with each other is preferable.

1.3. Step S3

As shown in FIG. 2C, in the step S3, the cathode mixture 3 and the solid electrolyte Mixture 6 are laminated, to obtain the laminate 7.

In the step S3, the cathode mixture 3 and the solid electrolyte mixture 6 may be accumulating layers of particles as shown in FIG. 2C. Like this, the laminate 7 is obtained by laminating an accumulating layer of particles of one of the cathode mixture 3 and the solid electrolyte mixture 6 to an accumulating layer of particles of the other thereof. In this case, joining the cathode mixture 3 to the solid electrolyte mixture 6 progresses at the same time as sintering the solid electrolyte mixture 6 in the step S4 described later. Whereby, the cathode 8 and the oxide solid electrolyte layer 9 can be firmly joined after the solid electrolyte mixture 6 is sintered (FIG. 4D).

In the step S3, for example, the laminate 7 can be made by: arranging and press-forming the solid electrolyte mixture 6 in a mold, to layer the solid electrolyte mixture 6; and arranging and press-forming the cathode mixture 3 on a surface of the layered solid electrolyte mixture 6, to layer the cathode mixture 3. Obtainment of the laminate 7 via press-forming leads to much higher sintered density in the step S4. When the laminate 7 is obtained via press-forming in the step S3, force of pressure applying to each layer is not restricted, but for example, is preferably 0.1 MPa to 1000 MPa. When a mold is used in the step S3, the mold is not limited as long as being made from material that does not substantially react with the above described mixtures. When pressing and heating are carried out in the step S4 described later, one may use a mold in the step S3, carry out press-forming, to form the laminate 7, and carry out the step S4 as the laminate 7 is accommodated in the mold. In this case, the mold is not limited as well as long as being made from material that can bear heating in the step S4.

The thickness of a layer consisting of the cathode mixture 3 and that consisting of the solid electrolyte mixture 6 are not limited in the laminate 7. The thickness may be properly determined according to the properties of the battery to be aimed.

1.4. Step S4

As shown in FIG. 2D, in the step S4, the laminate 7 is heated, to sinter at least the solid electrolyte mixture 6.

The step S4 can be carried out using known heating means. A heating temperature in S4 is not limited as long as the solid electrolyte mixture 6 can be sintered. For example, the laminate 7 is heated at a temperature equal to or higher than the melting point of the lithium salt 5, which enables the solid electrolyte mixture 6 to be sintered. On the other hand, the heating temperature is preferably as low as possible in view of suppressing unnecessary chemical reaction of the cathode mixture 3 and the solid electrolyte mixture 6, and in view of energy efficiency. Specifically, heating is preferably carried out at a temperature lower than 600° C., and more preferably at a temperature of equal to or lower than 400° C. depending on the melting point of the lithium salt 5 though. As described later, when an anode material 11' is joined at the same time when the solid electrolyte mixture 6 is sintered (see FIG. 3B), the heating temperature is preferably lower than 600° C. as well in view of suppressing unnecessary chemical reaction of the anode material 11' and the solid electrolyte mixture 6.

A heating atmosphere in the step S4 is not restricted as long as at least the solid electrolyte mixture 6 can be sintered without unnecessary reaction caused in the laminate 7. Examples of an atmosphere under which sintering can be carried out include various atmospheres such as oxygen-containing atmospheres (an air atmosphere, the atmosphere, etc.), and inert gas atmospheres.

In the step S4, an apparent volume of the laminate 7 is gradually becoming small as sintering is progressing. Here, there is a case where air bubbles and the like inside do not completely come out in sintering, and voids remain inside the sintered electrode 10. Preferably, the laminate 7 is heated while pressurized, or the laminate 7 is heated after pressurized in the step S4 in order to suppress generation of these voids and obtain the sintered electrode 10 of much higher density. Specifically, the laminate 7 is preferably heated while pressurized. In the step S4, when the laminate 7 is pressurized, force of the pressure is not restricted, but for example, is preferably 0.1 MPa to 1000 MPa. Means for pressurizing the laminate 7 is not restricted. For example, the laminate 7 can be heated while pressurized by using a mold made from material that does not react with the laminate 7 substantially, and can bear heating in the step S4 as described above.

As described above, according to the producing method S10, the sintering temperature of the oxide solid electrolyte layer 9 can be lowered by using the solid electrolyte mixture 6 including the LLZ 4 and the lithium salt 5, and as a result, the sintering temperature of the sintered electrode 10 can be lowered. According to the producing method S10, an acid generated by the reaction of the LLZ 4 and the lithium salt 5 can be neutralized with the hydroxide 2, reaction of the composite active material 1 and the acid can be suppressed, and deterioration of the cathode active material can be suppressed, by using the cathode mixture 3 including the lithium containing composite oxide 1 as a cathode active material and the hydroxide 2. That is, the sintered electrode 10 of a high cathode capacity can be obtained.

2. Method for Producing Oxide Solid-State Battery

Figure 3A:
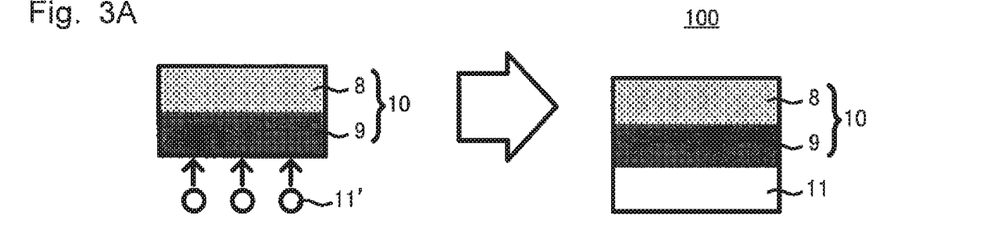
FIGS. 3A and 3B are explanatory views of examples of a method for joining an anode.
Figure 3B:
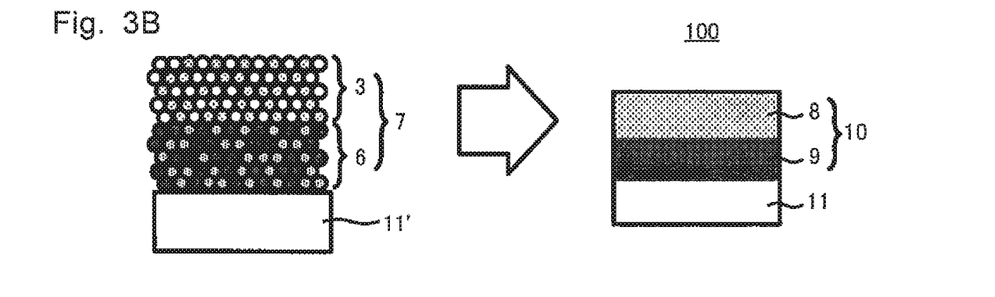

An oxide solid-state battery can be produced via a step of obtaining the sintered electrode 10 by the producing method S10; and providing an anode for the sintered electrode 10. For example, as shown in FIG. 3A, an oxide solid-state battery 100 including the cathode 8, the oxide solid electrolyte layer 9, and the anode 11 can be produced by, after producing the sintered electrode 10, depositing the anode material 11' on a surface of the oxide solid electrolyte layer 9 of the sintered electrode 10 (a surface of the oxide solid electrolyte layer 9 on the opposite side of the cathode 8). Or, as shown in FIG. 3B, the oxide solid-state battery 100 including the cathode 8, the oxide solid electrolyte layer 9, and the anode 11 can be also produced by, when producing the sintered electrode 10, heating the laminate 7 to sinter at least the solid electrolyte mixture 6, and at the same time joining the anode material 11' to the solid electrolyte mixture 6. Specifically, the latter (FIG. 3B) is preferable because the oxide solid electrolyte layer 9 and the anode 11 can be firmly joined as the producing steps are simplified by progress of joining the cathode mixture 3 to the solid electrolyte mixture 6 and joining the anode material 11' to the solid electrolyte mixture 6 at the same time, using heating treatment on the laminate 7.

The anode material 11' and the anode 11 are not restricted as long as including an anode active material. Examples of an anode active material that can be employed here include silicon and lithium. Silicon is preferable because the battery can have a higher capacity.

According to a finding of the inventors of the present application, when silicon is used as an anode active material and LLZ is used as an oxide solid electrolyte, there might be a case where silicon and LLZ react with each other at 600° C. or higher, to form a high resistance layer. Therefore when the anode material 11' is joined to the solid electrolyte mixture 6 by heating (in the case of FIG. 3B), the heating temperature is preferably lower than 600° C.

The oxide solid-state battery 100 is provided with collectors, terminals, and so on properly. Methods for placing them themselves are publicly known, and thus, description thereof is omitted here.

As described above, the oxide solid-state battery 100 can be easily produced by using the sintered electrode 10. Here, the cathode capacity is large because deterioration of the cathode active material due to an acid is suppressed in the sintered electrode 10. That is, charge and discharge capacities of the battery can be improved by producing the oxide solid-state battery 100 using the sintered electrode 10.

EXAMPLES

1. Example 1

1.1. Making Solid Electrolyte Mixture

Lithium lanthanum zirconate ($Li_7La_3Zr_2O_{12}$, LLZ) having a garnet structure was touched to pure water, to substitute hydrogen (H+) for some of lithium (Li+). In a mortar, 1 g of hydrogen-substituted LLZ, and 0.1 g of $LiNO_3$ as a lithium salt were mixed, to obtain a solid electrolyte mixture.

1.2. Making Cathode Mixture

In a mortar, 0.5632 g of lithium cobaltate ($LiCoO_2$) having a layered rock-salt structure as a cathode active material, 0.0248 g of LiOH as a hydroxide, and 0.4120 g of the above solid electrolyte mixture were mixed, to obtain a cathode mixture.

1.3. Making Laminate

Into a pelleting jig made by alumina of 11.28 mm in diameter (1 cm$^2$), 0.450 g of the solid electrolyte mixture was put, and press-formed with a die made by stainless steel at 100 MPa in pressure, to be layered. Next, 0.026 g of the cathode mixture was laminated to the layered solid electrolyte mixture in the jig, and press-formed with the die at 100 MPa, to obtain a laminate of the cathode mixture and the solid electrolyte mixture.

1.4. Making Sintered Electrode

Successively, as being kept pressurized at 100 MPa in pressure, the laminate was heated under an argon atmosphere at 400° C. for 8 hours, to sinter the solid electrolyte mixture, and to join the solid electrolyte mixture to the cathode mixture. Then, the sintered electrode including a cathode and an oxide solid electrolyte layer was obtained.

1.5. Making Oxide Solid-State Battery

Lithium was deposited on a surface of the oxide solid electrolyte layer of the sintered electrode (a surface on the opposite side of the cathode) as an anode active material, to make an anode. Gold (Au) sheets were provided for surfaces of the cathode and anode as current collector foil, to obtain an oxide solid-state battery for evaluation. The obtained battery was stored in a glass desiccator in which an inert atmosphere was kept.

2. Example 2

An oxide solid-state battery for evaluation was obtained in the same way as the example 1 except that lithium cobaltate (LiCoO$_2$) that was acid-treated under the following conditions was used as a cathode active material.

(Acid-Treating Cathode Active Material)

Into a beaker, 500 ml of hydrochloric acid (HCl) that was adjusted to be 1 in pH was put, and 3 g of lithium cobaltate was added thereto. After that, the resultant was stirred using a stirrer at 500 rpm in rotation speed at 25° C. for 16 hours. After stirring was ended, the resultant liquid was filtered through filter paper, to obtain acid-treated lithium cobaltate.

3. Comparative Example 1

In a mortar, 0.5776 g of lithium cobaltate (LiCoO$_2$), and 0.4224 g of the above solid electrolyte mixture were mixed, to obtain a cathode mixture. An oxide solid-state battery for evaluation was obtained in the same way as the example 1 except the above.

4. Evaluation Method

4.1. Charge Discharge Test

Figure 4:
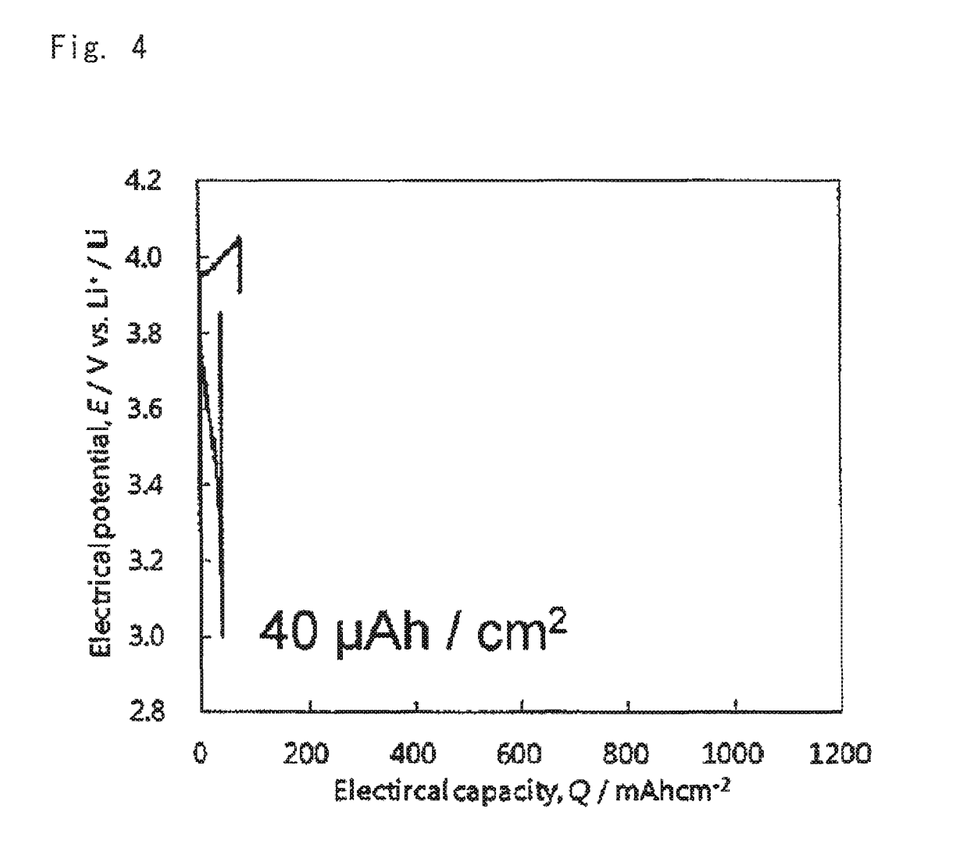
FIG. 4 shows the initial charge discharge curves of an oxide solid-state battery according to comparative example 1.
Figure 5:
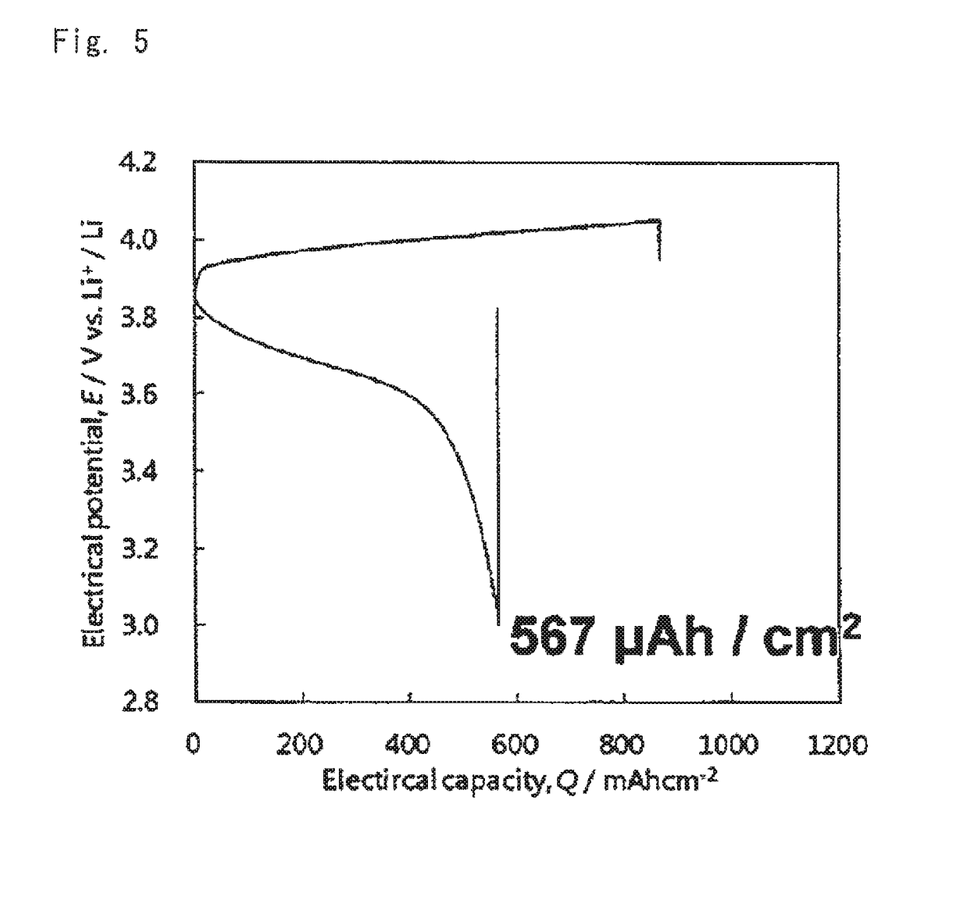
FIG. 5 shows the initial charge discharge curves of an oxide solid-state battery according to example 1.
Figure 6:
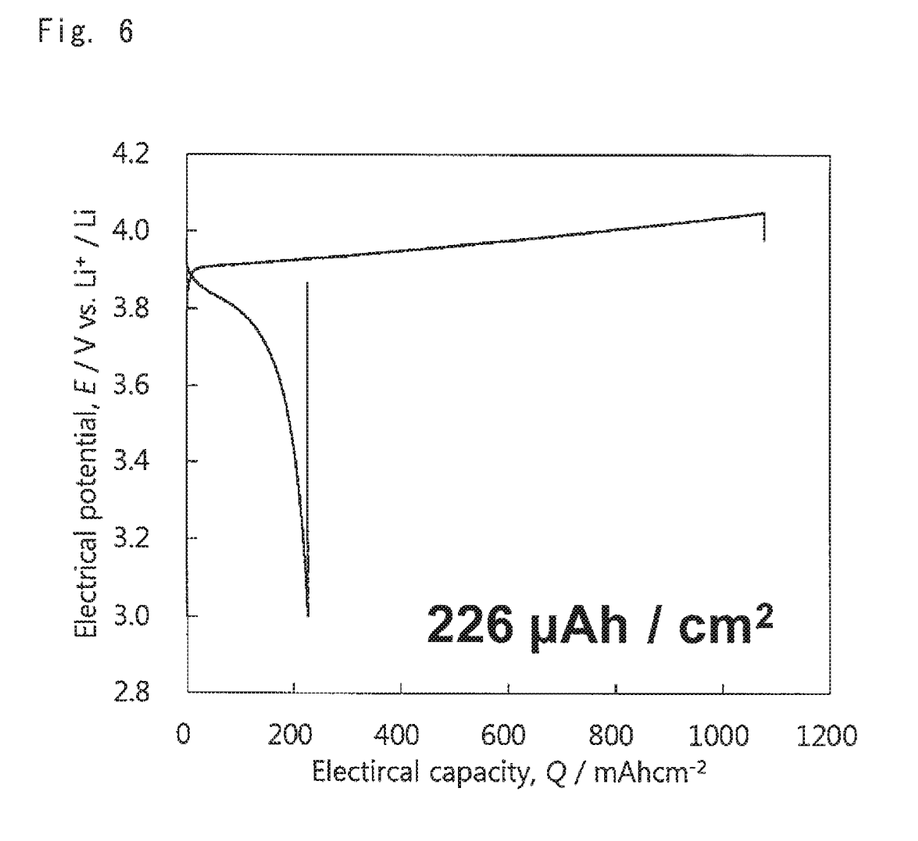
FIG. 6 shows the initial charge discharge curves of an oxide solid-state battery according to example 2.

Charge discharge test was performed on the oxide solid-state batteries for evaluation under the conditions of: voltage range 4.05 V-3.00 V, current value 10 μA; and temperature 60° C. Results thereof are shown in FIGS. 4 to 6. FIG. 4 shows the charge discharge curves of the battery according to comparative example 1, FIG. 5 shows the charge discharge curves of the battery according to example 1, and FIG. 6 shows the charge discharge curves of the battery according to example 2.

4.2 Impedance Measurement

Figure 7:
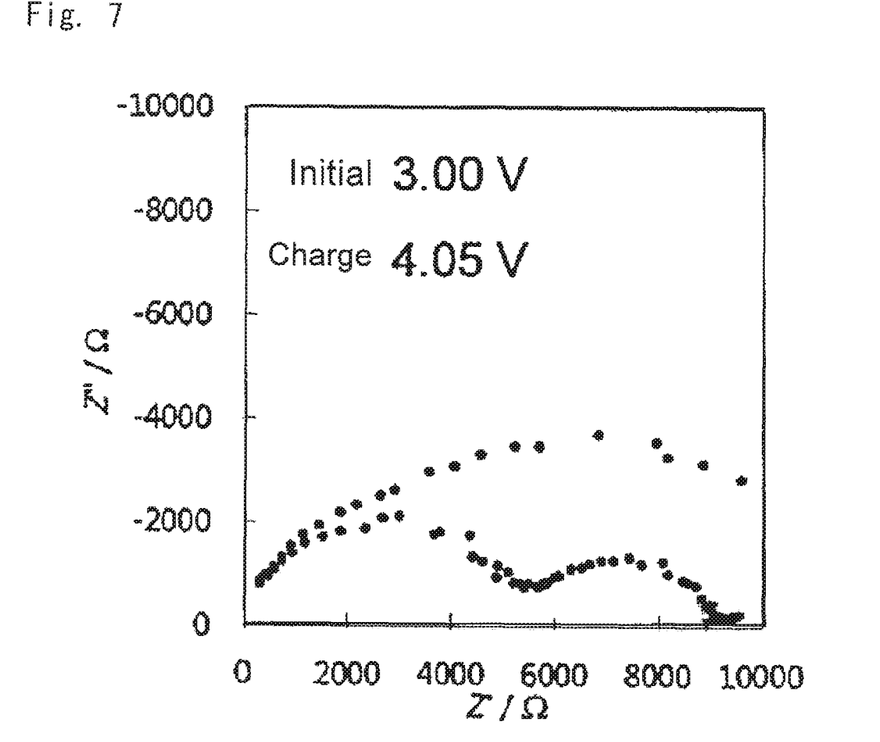
FIG. 7 shows the results of measuring impedance of the oxide solid-state battery according to comparative example 1.
Figure 8:
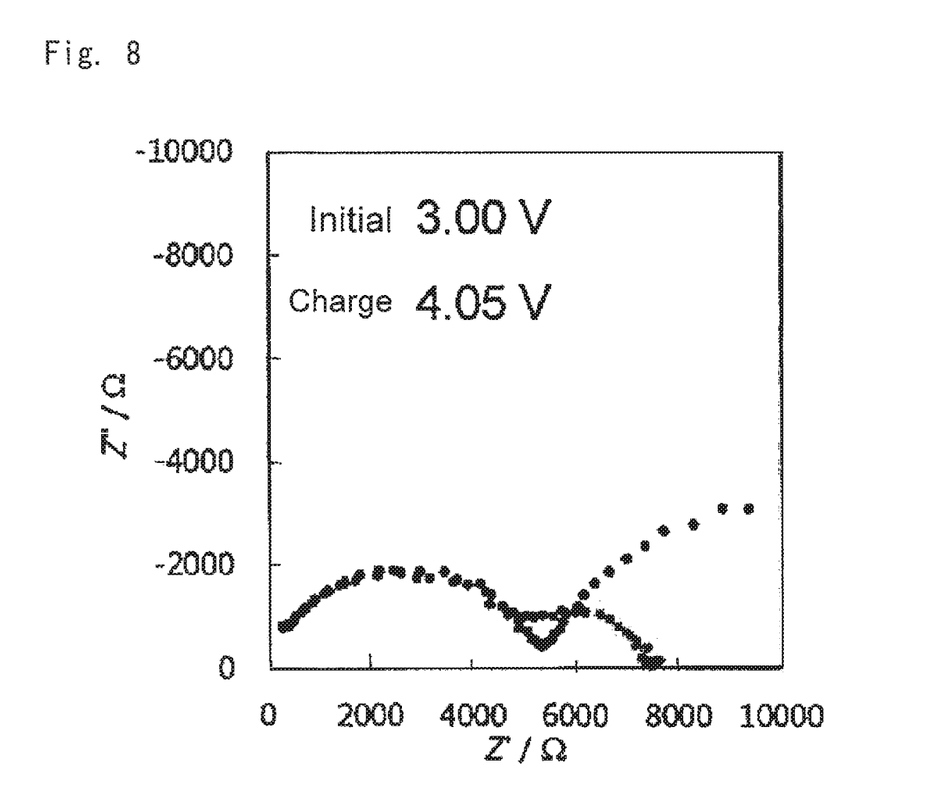
FIG. 8 shows the results of measuring impedance of the oxide solid-state battery according to example 1.
Figure 9:
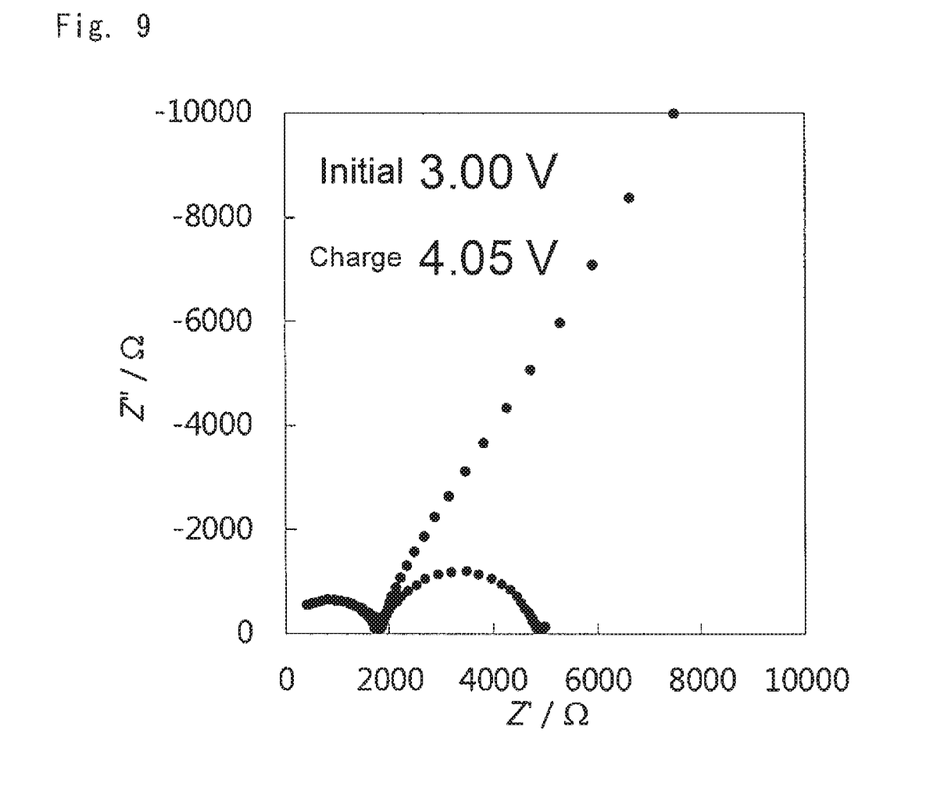
FIG. 9 shows the results of measuring impedance of the oxide solid-state battery according to example 2.

Impedances of the oxide solid-state batteries for evaluation were measured under conditions of: frequency range 0.1-10$^6$ Hz; applied voltage 25 mV; and temperature 60° C. Results thereof are shown in FIGS. 7 to 9. FIG. 7 shows the results of measuring impedance of the battery according to comparative example 1, FIG. 8 shows the results of measuring impedance of the battery according to example 1, and FIG. 9 shows the results of measuring impedance of the battery according to example 2.

As is clear from the results shown in FIGS. 4 to 9 when the battery was configured using the cathode mixture including a hydroxide (examples 1 and 2), charge and discharge capacities of the battery were outstandingly increased, and battery resistance was small, compared to the case where the battery was configured using the cathode mixture not including a hydroxide (comparative example 1). It is concluded that this was because an acid generated by reaction of LLZ and the lithium salt was able to be neutralized with the hydroxide at the stage of producing the sintered electrode, and deterioration of the cathode active material was able to be suppressed.

INDUSTRIAL APPLICABILITY

The sintered electrode produced according to the producing method of this disclosure has high sintered density, high electronic conductivity, and moreover a high cathode capacity. Thus, this sintered electrode can be used as an electrode for an oxide solid-state battery. The oxide solid-state battery produced according to the producing method of this disclosure has a high capacity, and moreover high energy density because of unnecessity of any restraining member or the like for reducing interface resistance. Therefore, for example, this oxide solid-state battery can be used as an in-vehicle large-sized power source.

REFERENCE SIGNS LIST

1 lithium containing composite oxide
2 hydroxide
3 cathode mixture
4 lithium lanthanum zirconate
5 lithium salt
6 solid electrolyte mixture
7 laminate
8 cathode
9 oxide solid electrolyte layer
10 sintered electrode
11 anode
100 oxide solid-state battery

What is claimed is:

1. A method for producing a sintered electrode which uses a lithium containing composite oxide as a cathode active material, and lithium lanthanum zirconate as an oxide solid electrolyte, the method comprising:
   mixing at least the lithium containing composite oxide and a hydroxide, to obtain a cathode mixture;
   mixing at least the lithium lanthanum zirconate and a lithium salt to obtain a solid mixture of electrolyte components, wherein the lithium salt is at least one selected from the group consisting of lithium nitrate, lithium formate, lithium acetate, lithium chloride, and lithium sulfate;
   laminating the cathode mixture and the solid mixture of electrolyte components, to obtain a laminate; and
   heating the laminate, to sinter at least the solid mixture of electrolyte components,
   wherein the hydroxide is an alkali metal hydroxide.

2. The method according to claim 1, wherein the lithium containing composite oxide used as the cathode active material has a layered rock-salt structure.

3. The method according to claim 1, further comprising:
substituting hydrogen for at least some of lithium that constitutes lithium lanthanum zirconate; and
mixing hydrogen-substituted lithium lanthanum zirconate and the lithium salt, to obtain the solid mixture of electrolyte components.

4. The method according to claim 1, wherein
a melting point of the lithium salt is lower than 600° C., and
when at least the solid mixture of electrolyte components is sintered by heating the laminate, the laminate is heated at a temperature of no less than the melting point of the lithium salt, and lower than 600° C.

5. A method for producing an oxide solid-state battery, the method comprising:
obtaining a sintered electrode by the method according to claim 1; and
providing an anode for the sintered electrode.

6. The method according to claim 1, wherein
the lithium salt is at least two selected from the group consisting of lithium nitrate, lithium formate, lithium acetate, lithium chloride, and lithium sulfate.

7. The method according to claim 1, wherein the hydroxide is a lithium hydroxide.

* * * * *